(12) United States Patent
Chen

(10) Patent No.: US 8,982,276 B2
(45) Date of Patent: Mar. 17, 2015

(54) CAMERA MODULE WITH AMBIENT LIGHT SENSOR

(71) Applicant: Hon Hai Precision Industry Co., Ltd., New Taipei (TW)

(72) Inventor: Shin-Wen Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/060,589

(22) Filed: Oct. 22, 2013

(65) Prior Publication Data

US 2014/0293124 A1 Oct. 2, 2014

(30) Foreign Application Priority Data

Apr. 2, 2013 (CN) .......................... 2013101125298

(51) Int. Cl.
*H04N 5/225* (2006.01)
*G01J 1/42* (2006.01)

(52) U.S. Cl.
CPC ............ *G01J 1/4204* (2013.01); *H04N 5/2254* (2013.01)
USPC .......................................................... 348/374

(58) Field of Classification Search
USPC ........................................ 348/374; 250/208.1
See application file for complete search history.

(56) References Cited

U.S. PATENT DOCUMENTS

| 5,534,962 | A  | * | 7/1996  | Zander | 396/6   |
|-----------|----|---|---------|--------|---------|
| 8,582,026 | B2 | * | 11/2013 | Ko et al. | 348/374 |
| 8,670,068 | B2 | * | 3/2014  | Hsiung | 348/374 |

* cited by examiner

*Primary Examiner* — Anthony J Daniels
(74) *Attorney, Agent, or Firm* — Novak Druce Connolly Bove + Quigg LLP

(57) ABSTRACT

A camera module includes a shell, an ambient light sensor, and a lens module having a printed circuit board. The shell has a seat in its front surface, a first connector on its back surface, and circuits connecting the first connector to the seat by a laser direct structure technology. The ALS is soldered to the seat. The PCB is attached to the back surface of the shell and includes a second connector connected to the first connector.

4 Claims, 3 Drawing Sheets

CAMERA MODULE WITH AMBIENT LIGHT SENSOR

BACKGROUND

1. Technical Field

The present disclosure relates to camera modules, and particularly to a camera module having an ambient light sensor (ALS).

2. Description of Related Art

ALSs are employed in camera modules to detect an ambient light intensity to determine an exposure for the camera modules. To ensure accuracy, the ALS is located at a front side of the camera module. A flexible printed circuit board (FPCB) of the camera module is located at a back side of the camera module. However, the FPCB needs to be bent towards the front side to electrically connect to the ALS. As such, a size of the FPCB is increased, which increases a cost and size of the camera module.

Therefore, it is desirable to provide a camera module that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
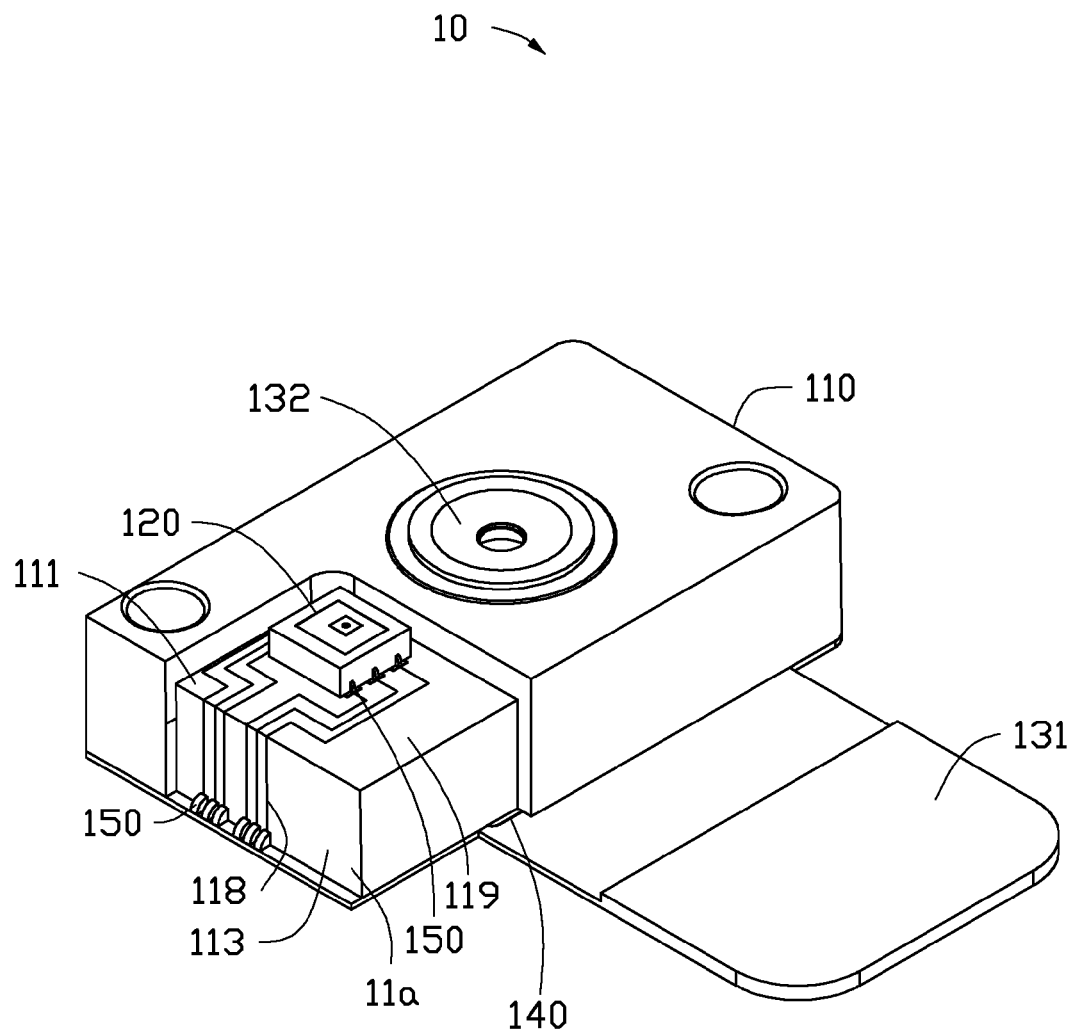
FIG. 1 is an isometric, schematic view of a camera module in accordance with an embodiment.
Figure 2:
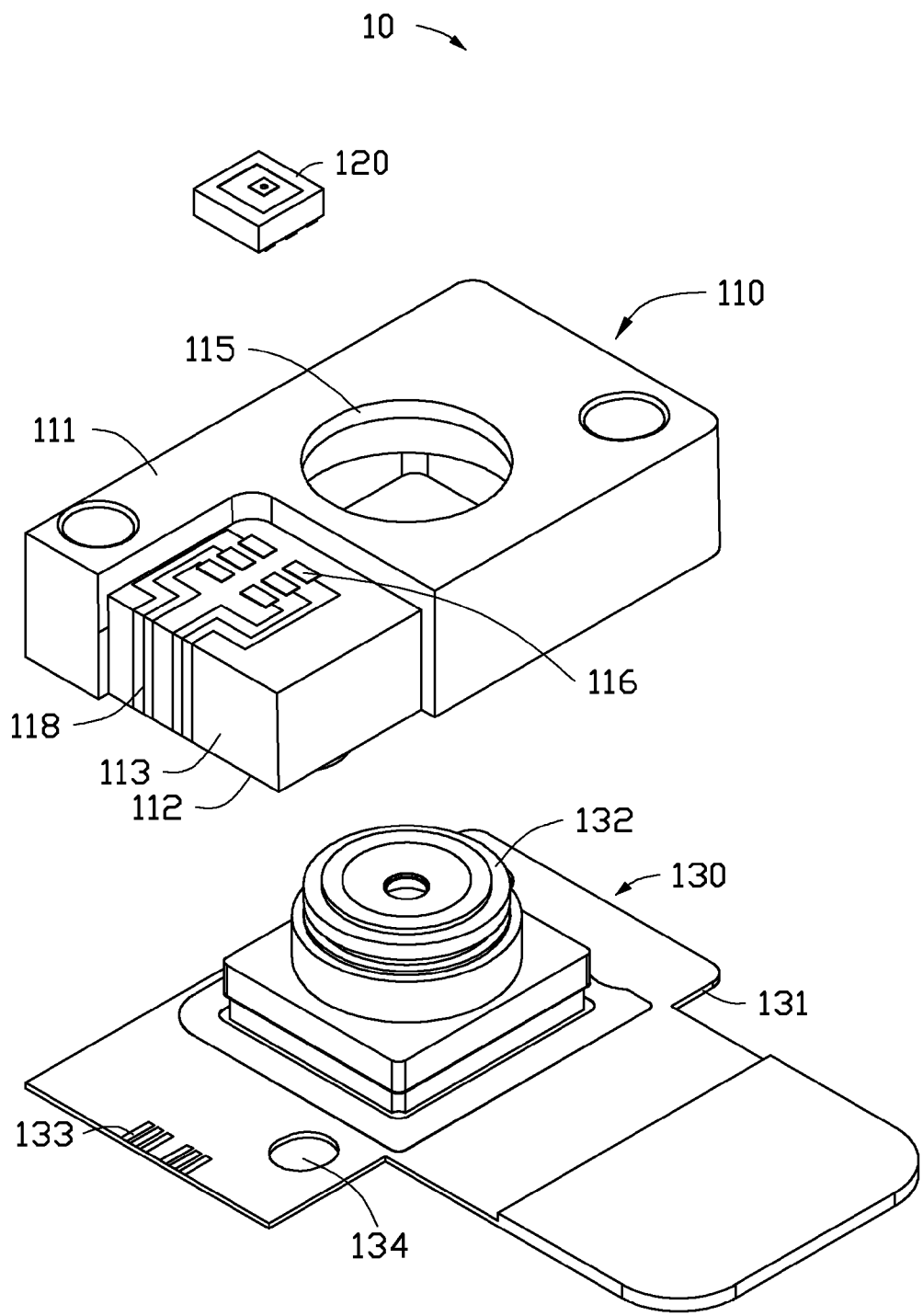
FIG. 2 is an exploded view of the camera module of FIG. 1.
Figure 3:
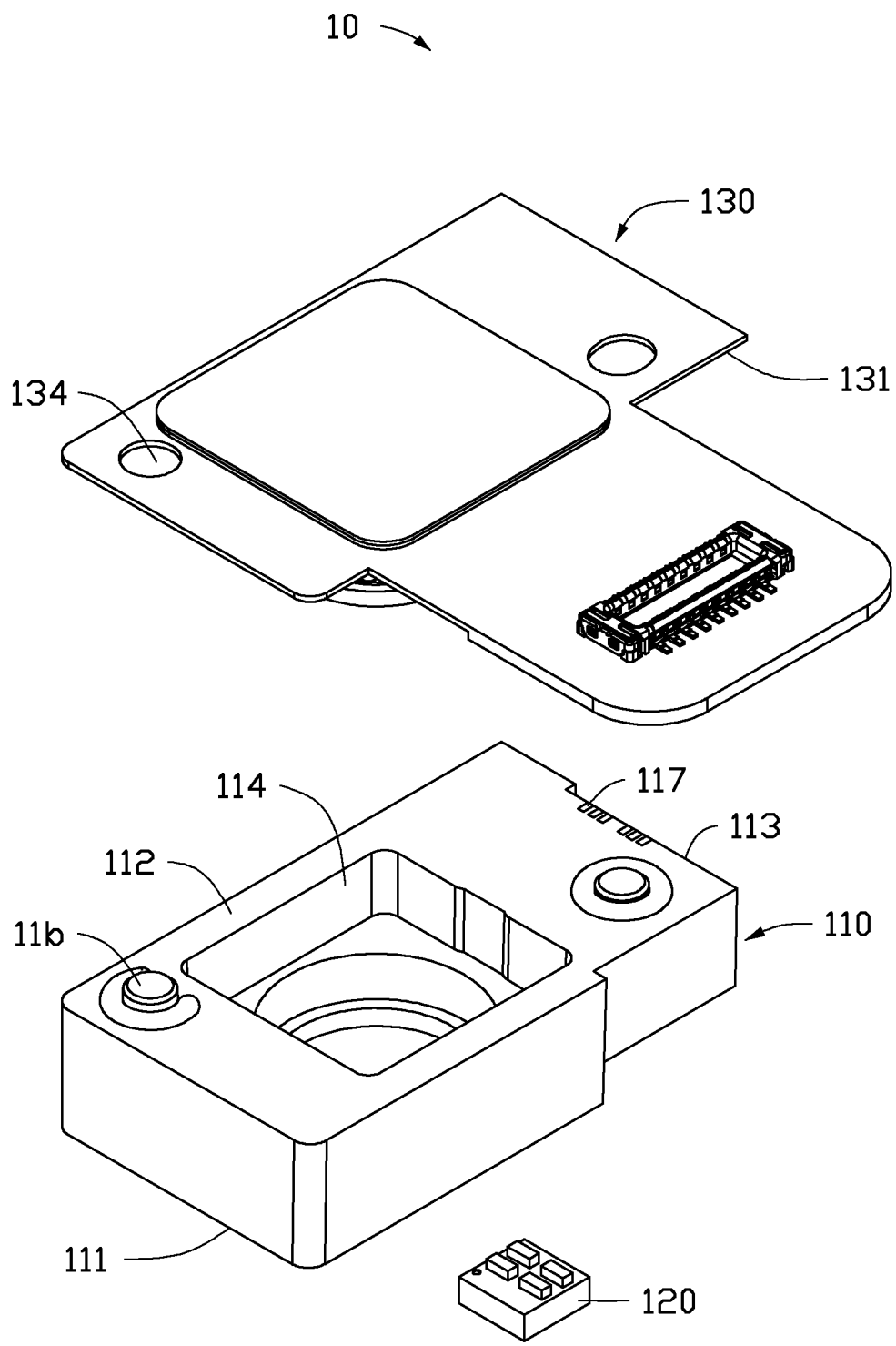
FIG. 3 is similar with FIG. 2, but viewed from another angle.

FIGS. 1-3 show a camera module 10, according to an embodiment. The camera module 10 includes a shell 110, an ALS 120, and a lens module 130. The shell 110 includes a front surface 111, a back surface 112 opposite to the front surface 111, and a side surface 113 connecting the front surface 111 to the back surface 112. The shell 110 defines a receiving space 114 in the back surface 112 and defines a through hole 115 in the front surface 111. The through hole 115 communicates with the receiving space 114. The shell 110 also includes a seat 116 formed on the front surface 111, and a first connector 117 formed on the back surface 112. Circuits 118 are formed on the front surface 111, the back surface 112, and the side surface 113 to connect the seat 116 to the first connector 117. The seat 116, the first connector 117, and the circuits 118 are formed by a laser direct structure (LDS) technology. The ALS 120 is located on the front surface 111 and is soldered to the seat 116. The lens module 130 includes a printed circuit board (PCB) 131 and a lens 132. The lens 132 is positioned on and electrically connected to the PCB 131 and is received in the receiving space 114 and the through hole 115 to be exposed through the through hole 115. The PCB 131 includes a second connector 133, which electrically connects to the first connector 117.

In this embodiment, the shell 110 and the receiving groove 114 are substantially rectangular, and the through hole 115 is substantially circular. In other embodiments, the shell 110, the receiving groove 114, and the through hole 115 can be other shapes and take on different forms according to needs.

The shell 110 defines a first recess 119 in the front surface 111 and defines a second recess 11a in the side surface 113. The second recess 11a communicates with the first recess 119. The seat 116 and the ALS 120 are received in the first recess 119. The circuits 118 are received in the first recess 119 and the second recess 11a. A depth of the first recess 119 is greater than a total height of the seat 116 and the ALS 120. As such, the ALS 120 is protected in the first recess 119 from being damaged. The circuits 18 are completely received in the first recess 119 and the second recess 11a. As such, the circuits 118 are protected in the first recess 119 and the second recess 11a from being damaged.

The first recess 119 and the second recess 11a are substantially rectangular in this embodiment but can take other forms in other embodiments.

The shell 110 includes a first locating structure 11b formed on the back surface 112. The PCB 131 includes a second locating structure 134. The shell 110 is assembled to the PCB 131 by engagement between the first locating structure 11b and the second locating structure 134.

In this embodiment, the first locating structure 11b is two poles extending substantially perpendicularly away from the back surface 112. The second locating structure 134 is two holes defined in the PCB 131 corresponding to the two poles in position and size.

In other embodiments, the first locating structure 11b and the second locating structure 134 can take other forms according to needs.

The PCB 131 is fixed to the back surface 112 by a curable adhesive 140.

In assembly, the shell 110 is first provided by an injection mold, for example. A solder paste 150 is applied to the seat 116, and the ALS 120 is soldered to the seat 116. The solder paste 150 is also applied to the second connector 133 of the camera module 130 so that the shell 110 is soldered to the PCB 131. The lens 132 is received in the receiving space 114 and the through hole 115, and the first connector 117 is electrically connected to the second connector 133 via the solder paste 150.

As such, the ALS 120 is located at a front side (i.e., the front surface 111) of the camera module 10 and communicates with the PCB 131 without bending the PCB 131. Therefore, a cost and size of the camera module 10 is effectively reduced.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A camera module, comprising:
   a shell comprising a front surface, a back surface opposite to the front surface, and a side surface connecting the front surface and the back surface, the shell defining a receiving space in the back surface and a through hole in the front surface, the through hole communicating with the receiving space, the shell comprising a seat formed on the front surface, a first connector formed on the back surface, and circuits, the circuits formed on the front surface, the side surface, and the back surface and connecting the seat to the first connector;
   an ambient light sensor (ALS) positioned on the front surface and soldered to the seat;
   a printed circuit board (PCB) attached to the back surface and comprising a second connector connecting with the first connector; and a lens positioned on and electrically connected with the PCB and received in the receiving space and the through hole;

wherein the seat, the first connector, and the circuits are formed by a laser direct structure (LDS) technology.

2. The camera module of claim 1, wherein the shell defines a first recess in the front surface and a second recess in the side surface, the second recess intersecting with the first recess, the seat and the ALS are received in the first recess, the circuits are received in the first recess and the second recess, a depth of the first recess is greater than a total height of the seat and the ALS, and a depth of each of the first recess and the second recess is greater than a height of the circuits.

3. The camera module of claim 1, wherein the shell comprises a first locating structure formed on the back surface, the PCB comprises a second locating structure, and the shell is located on the PCB by engagement between the first locating structure and the second locating structure.

4. The camera module of claim 3, wherein the first locating structure comprises two poles extending up from the back surface, and the second locating structure defines two holes in the PCB corresponding to the poles in position and size.

\* \* \* \* \*